Aug. 21, 1962 C. M. KRON 3,050,378
PRODUCTION OF DRY CARBON BLACK PELLETS
Filed Dec. 8, 1958
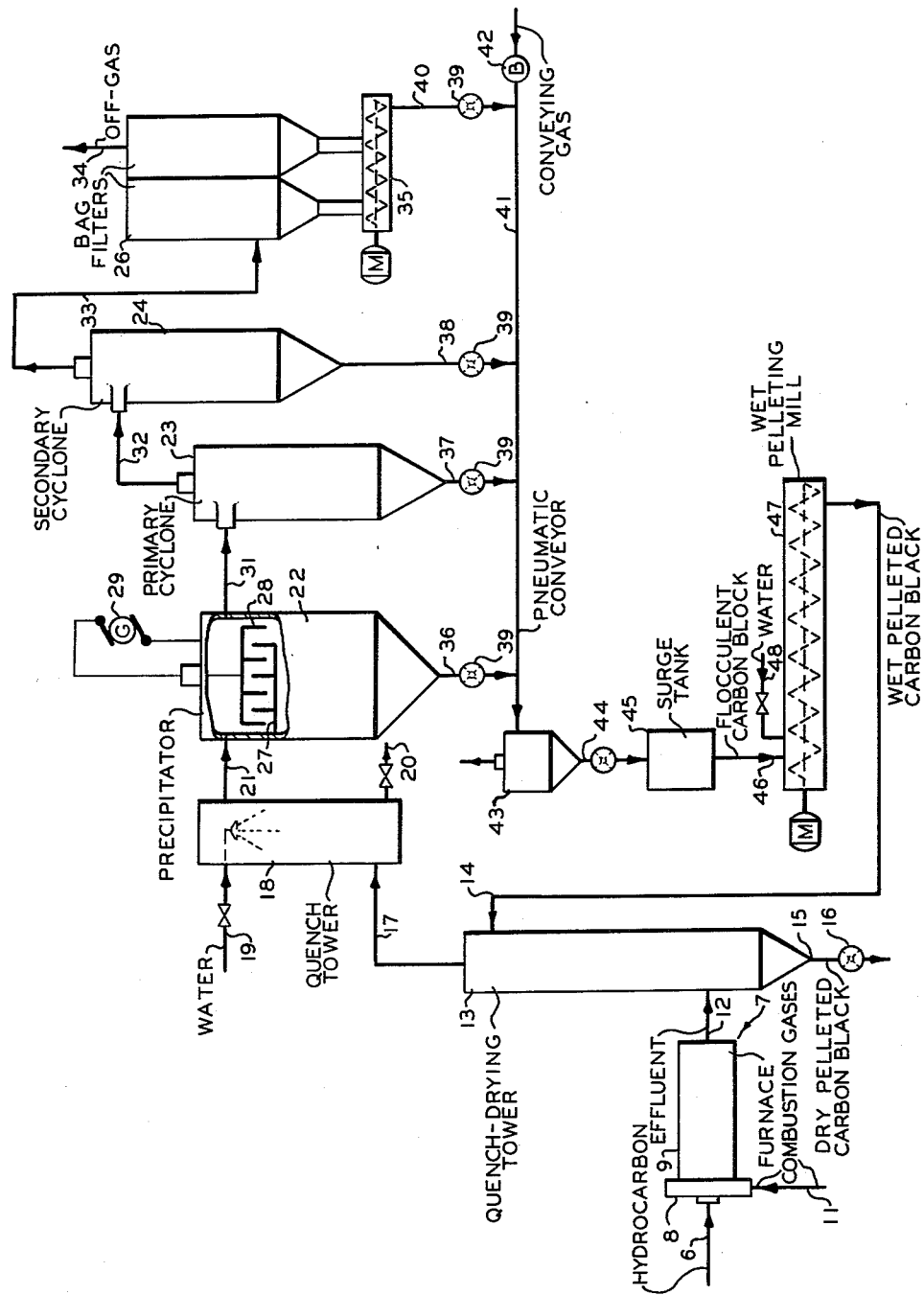
INVENTOR.
C. M. KRON
BY Hudson E. Young
ATTORNEYS

United States Patent Office

3,050,378
Patented Aug. 21, 1962

3,050,378
PRODUCTION OF DRY CARBON BLACK PELLETS
Carl M. Kron, Houston, Tex., assignor to Phillips Petroleum Company, a corporation of Delaware
Filed Dec. 8, 1958, Ser. No. 778,730
1 Claim. (Cl. 23—314)

This invention relates to the production of dry carbon black pellets. In another aspect, it relates to a process of drying carbon black pellets produced by a wet pelleting process. In a further aspect, it relates to an integrated process of quenching hot carbon black furnace effluent and drying wet pelleted carbon black.

Carbon black is an amorphous form of carbon which is produced by incomplete combustion of gaseous hydrocarbon, such as natural gas, or by the pyrolysis of various hydrocarbons, such as a hydrocarbon liquid or gas. When produced by the furnace processes, the resulting hot gaseous furnace effluent, containing finely divided carbon black suspended therein, is cooled by indirect heat exchange with the atmosphere and/or by direct heat exchange with a cooling liquid, generally water, and the cooled gaseous effluent then passed to a series of gas-solids separators where the carbon black is separated from the effluent. The separated carbon black is in the form of a finely divided powder which is easily dispersed in air as a dust. In this form, the carbon black cannot be readily handled, stored, or shipped and it also is a source of annoyance and somewhat of a hazard to workmen. For these reasons, it is customary to reduce the finely divided or flocculent carbon black to an agglomerated or pelleted form so as to increase the bulk density thereof and lessen its tendency to disperse in air.

The pelleting of the separated, flocculent carbon black is often accomplished by a wet pelleting process and it is this type of pelleting which is the concern of this invention. The conventional wet pelleting method involves wetting a portion of the raw carbon black, preferably with a fine spray of a liquid, generally water, while subjecting the carbon black to mechanical agitation such as tumbling, generally in a rotating mill, which agglomerates the carbon black into the form of wet pellets. The wet pellets (e.g., 40–55% moisture) formed are then conventionally subjected to a drying operation to remove the water (e.g., to about 1%) therefrom prior to packaging and shipping. This drying operation is conventionally carried out in a separate dryer, such as that of the rotary type, wherein the tumbling wet pellets are heated and dried with heated air or flue gas at a temperature within the range of about 240 to 500° F. In many cases a second similar dryer is used to complete the drying operation.

This conventional use of a separate dryer, of course, necessitates further equipment and utility expenses. Use of such a dryer is disadvantageous in that design considerations limit the temperature of the available heating medium, and also require relatively long periods or durations, e.g., four hours, to effect complete drying of the wet pellets. In addition, this conventional use of a dryer is often disadvantageous in that the consequent attrition of the carbon black pellets as they are mechanically agitated causes some of the carbon black to go to loose carbon black. Furthermore, since these dryers employ an oxidizing atmosphere it often has an adverse effect on the quality of the carbon black pellets, especially where the carbon black is used in compounding rubber.

Accordingly, an object of this invention is to provide an improved method or process for the production of dry carbon black pellets which process overcomes the aforementioned drying problems and disadvantages involved in conventional drying operations. Another object is to provide an improved process of drying carbon black pellets produced by a wet pelleting process. Another object is to provide an integrated process of quenching hot, gaseous furnace effluent and drying wet carbon black pellets in such a manner as to utilize the available sensible heat of the furnace effluent. Another object is to eliminate the need and expense of conventional dryers for drying wet pelleted carbon black. Another object is to increase the recovery of carbon black and provide dry carbon black pellets of superior quality for use in compounding rubber. Another object is to dry wet pelleted carbon black in such a manner as to obviate the use of primary quench in a carbon black furnace. Another object is to dry wet pelleted carbon black in such a manner as to reduced the tendency for the pellets to form loose carbon black dust during the drying operation. A further object is to materially shorten the time required to effect complete drying of wet pelleted carbon black. Other objects and advantages of this invention will become apparent to those skilled in the art from the following discussion, appended claim, and accompanying drawing in which a single figure is shown in diagrammatic form of a flow process for drying wet pellet carbon black pellets according to this invention.

Referring now to the aforementioned diagrammatic flow process, hydrocarbon charging stock, such as a heavy oil (of the aromatic type) derived from a cracking process which has an API gravity of 0–10 degrees, is axially supplied via line 6 to a furnace or reactor, generally designated 7. This charging stock is preferably preheated, for example, in a direct-fired preheater of the Dutch oven type, to a selected temperature or range of temperatures such as 450–550° F. Furnace 7 can comprise any carbon black furnace known to the prior art such as that disclosed in Ayres Reissue Patent 22,886 of June 3, 1947, that of Krejci, 2,375,795 of May 15, 1945, or that of Krejci, 2,564,700 of August 21, 1951. The reactor 7 shown in the drawing, can have a short, expanded, cylindrical section 8 at its upstream end and a smaller elongated, cylindrical section 9 directly connected with the expanded section. Combustion gases, such as a mixture of air and natural gas, are preferably conveyed to the expanded section 8 of furnace 7 via line 11 and tangentially introduced therein. In furnace 7, the hydrocarbon charging stock is converted by a pyrolytic reaction and/or incomplete combustion into a hot gaseous effluent leaving the furnace by a discharge conduit or smoke header 12 connected to the downstream end of cylindrical section 9. In operation, the reaction zone of reactor 7 remains at a substantially uniform temperature, for example, on the order of 1500 to 3300° F., preferably 2300 to 2600° F., depending on the quality of the carbon black desired to be produced. In starting the operation of the furnace 7, it is preferred to preheat it to a temperature, for example, in excess of 1000° F., using sufficient air to provide complete combustion of the tangential fuel before introducing the charging stock stream. It is a usual conventional practice to quench the hot furnace effluent by injecting a spray of water into the downstream end of the elongated, cylindrical section 9. However, this primary quench is obviated by the practice of this invention, as will be explained in detail hereinafter; however, while such a primary quench is not essential to the instant invention, it may be employed if desired, to quench the effluent, although, when so quenched, it will not be necessary to use as much water as hereinbefore found necessary to cool the furnace effluent. Some cooling of the furnace effluent can be effected by indirectly heat exchanging the effluent with the ambient atmosphere surrounding effluent line 12.

In a carbon plant producing from 4 to 5 pounds of carbon black per gallon of oil feed charged to the carbon black furnace, general and typical compositions of the gases in the hot furnace effluent are set forth in Table I.

TABLE I

| Component | Volume percent (dry basis) | |
|---|---|---|
| | General | Typical |
| CO | 5 to 15 | 5.7 |
| CO$_2$ | 3 to 10 | 9.7 |
| H$_2$ | 5 to 17 | 13.8 |
| CH$_4$ | 0.1 to 1.5 | 0.7 |
| C$_2$H$_2$ | 0.1 to 1.0 | 0.6 |
| N$_2$ | 40 to 75 | 69.5 |
| | | 100.0 |

According to the practice of this invention, the hot furnace effluent, having a temperature in the range of 1000 to 2500° F., in line 12 is introduced into an unobstructed vertical quench-drying tower 13 at an intermediate point therein. In tower 13, the hot reactor effluent flows upwardly and countercurrent to a downwardly descending stream of wet pelleted carbon black introduced via line 14 into the upper end of the tower. The wet pellets gravitate through tower 13 at impeded flow rates due to the tendency of the upflowing gases to suspend the pellets. As such, direct heat exchange of the wet pelleted carbon black, having a moisture content in the range of 40 to 55 percent, with the hot furnace effluent is effected, resulting in the substantially complete drying of the pelleted carbon black and substantial cooling or quenching of the furnace effluent, for example, to a temperature of 800 to 1500° F. The heat transfer rate of this direct heat exchange is exceedingly high, primarily because of the large surface area of the pellets and intimate contact with the hot furnace effluent. Dried, pelleted carbon black, having a moisture content of about 1 percent or lower, accumulates in the lower end of tower 13, which is preferably constructed in a conical shape, and the settled bed of dried carbon black pellets is withdrawn from the tower 13 via withdrawal line 15 having valve means 16 therein, such as a conventional star valve. If desired, a suitable deflecting baffle, not shown, can be positioned within the upper end of tower 13 so as to deflect the introduced wet pelleted carbon black. In tower 13, a certain amount of the finely divided flocculent carbon black suspended in the furnace effluent adheres to the surfaces of the downwardly descending pellets, thereby initially removing a small amount of carbon black from the furnace effluent. The resulting quenched or partially cooled furnace effluent, containing the bulk of the carbon black produced in the furnace 7, is withdrawn from the top of the tower 13 via line 17 and conveyed to a secondary quench tower 18. The latter is of conventional design, having spray equipment in the upper end thereof to permit a spray of liquid, such as water, supplied via line 19, to effect secondary quenching and cooling of the hot furnace effluent. Any moisture which may condense in quench tower 18 is removed via line 20 which is provided with a suitable drain valve.

The quenched furnace effluent is subsequently conducted from quench tower 18 via line 21 to a collection system which comprises a plurality of suitable gas-solids separator units which can be any conventional means for separating the carbon black and other solids from the furnace effluent; the number of separators employed can vary from one to as many as are desired. For purposes of illustrating a preferred embodiment of my invention, a specific set of carbon black separators which have been found useful in commercial carbon black plants have been illustrated in the drawing. They consist of an electrical precipitator 22, such as that of the Cottrell type, cyclone separators 23, 24, and a bag filter unit 26. The use of precipitator 22 is alternative.

The electrical precipitator 22 comprises pairs of oppositely charged plates or wires 27, 28, having a direct or alternating high potential current of opposite polarity thereon generated by suitable electrical generating means 29. The gaseous effluent in line 21 is passed between the pairs of charge plates 27 and 28 to precipitate a certain amount of carbon black which separates as flocculent material in the bottom of precipitator 22. A certain amount of agglomeration occurs in the carbon black remaining suspended in the gaseous effluent which is discharged from precipitator 22 into line 31.

The gaseous effluent in line 31 is conducted to a primary cyclone separator 23 and tangentially introduced therein. Some of the suspended carbon black in the gaseous effluent is thrown against the cylindrical walls of separator 23 and falls to the bottom as flocculent material, but often a considerable amount of carbon black remains suspended in the gaseous effluent and passes out through a discharge line 32. While, in some instances, one cyclone separator is sufficient, it has been found advantageous in commercial plants to use a plurality of cyclone separators. The percentage of carbon black removed from a cyclone separator varies with the velocity of the gaseous effluent and those skilled in the art will be able to readily determine the number, size, design, and velocities necessary to produce desirable results. The gaseous effluent in line 32 can be conveyed to secondary cyclone separator 24 which functions in the same manner as the primary cyclone separator 23 to remove a further amount of suspended carbon black.

The gaseous effluent discharged from secondary cyclone separator 24 via line 33 is further conducted to a conventional bag filter unit 26 for further recovery of suspended carbon black. Bag filter 26 can be divided into a plurality of chambers in which there are suspended a plurality of bag filtering members which can be made from cloth, nylon, or any other gas permeable fabric. This fabric substantially completes the removal of the suspended carbon black from the gaseous effluent and the carbon black-free off-gas can be discharged to the atmosphere via vent stack 34. This off-gas generally comprises such gases as nitrogen, carbon dioxide, carbon monoxide, hydrogen and water vapor. The carbon black separated by the bag filtering units can be dislodged from the gas permeable fabric by shaking the same or repressurizing the filtering compartments with a suitable gas so that the carbon black may be discharged therefrom into a suitable conveyor 35 which can be, for example, a motor operated screw-type conveyor.

During normal operations, the pressure in the collection system will generally be in the range of 2-6 inches of water gauge, and the temperature will be generally above the dew point of the effluent, for example, in the range of 400 to 450° F.

The electrical precipitator 22 and cyclone separators 23, 24 each comprise a gravity collection chamber at their lower portions, which may be made conical as shown, to aid in the discharge of carbon black through outlet conduits 36, 37 and 38, respectively. Suitable carbon black feeders 39 are installed within said outlet conduits. The bag filter conveyor 35 also discharges into an outlet conduit 40 also provided with a feeder 39. Various types of carbon black feeders may be employed, the conventional type of star valves shown in the drawing being preferred. The star valves 39 are not shown in detail as they are well-known devices similar to a revolving door having a paddle wheel with radial blades which allow the passage of solids by gravity as the paddle wheel rotates, while two or more of the radial paddles obstruct or substantially prevent the unregulated passage of gas through the carbon black feeder in either direction. Each of the star valves 39 can be operated by a suitable electrical motor. In order to convey the carbon black discharged by the carbon black feeders 39 to a central collection point, one or more pneumatic conveyors such as pneumatic conveyor 41 is provided. Conveyor 41 can be supplied with a side stream of reactor effluent obtained from any point in the collection system, such as lines 21, 31, 32 and 33, this conveying gas being conveyed in pneumatic conveyor 41 with the aid of a suitable gas blower 42. Alternatively, instead of a pneumatic collection conveyor, any other type of conveyor can be employed, such as a screw-type conveyor. The flocculent collected carbon black in conveyor 41 is preferably conveyed to a common collection point such as a small cyclone separator 43 installed at the terminal end of conveyor 41 so as to separate the conveyed carbon black from the conveyor gas, the discharged carbon black being conveyed via line 44 to a collecting surge tank 45.

The collected flocculent carbon black, having a moisture content of 1%, or less, in surge tank 45 is then conveyed via line 46 to any suitable wet pelleting equipment, such as pug mill 47, this particular mill being horizontally disposed and provided with an axial rotating shaft to which is connected suitable screw-type conveying blades, the rotatable shaft being driven by a suitable motor. The substantially dry flocculent carbon black introduced into the upstream end of the pug mill 47 is tumbled and agglomerated with the aid of a suitable liquid, such as water, sprayed into the upper end of the mill via spraying means 48. The resulting wet pelleted carbon black is discharged at the downstream end of the pug mill 47 and conveyed by suitable means, such as a screw-type or elevator type conveyor, and discharged via line 14 into the upper end of tower 13 as described hereinbefore.

The advantages of drying wet pelleted carbon black according to this invention are evident from the foregoing discussion. By utilizing the water in the wet pelleted carbon black to quench the hot furnace effluent in tower 13, the need for a conventional primary quench at the downstream end of the furnace 7 is eliminated, although it can be used if desired. Since the practice of this invention involves drying the wet pelleted carbon black by countercurrent direct heat exchange with the hot furnace effluent gases in tower 13, the need for facilities to produce combustion gases to dry wet pellets is eliminated, as is the need for a separate rotary dryer and additional utilities. The wet pelleted carbon black in directly contacting the hot furnace effluent picks up a small but significant amount of the suspended flocculent carbon black from the effluent and thus reduces the equipment requirements for collecting and wet pelleting the separated carbon black product. Furthermore, by drying the wet pelleted carbon black in a reducing, rather than an oxidizing, atmosphere, a superior grade of carbon black will be produced for use in imparting certain desirable characteristics to rubber. Furthermore, the use of the water in the wet pelleted carbon black to quench initially the hot reactor furnace effluent in tower 13 reduces the amount of water necessary to effect the secondary cooling of the effluent in secondary quench tower 18, thus materially aiding in the collection of the suspended carbon black in the collection system. Since the quench-drying tower 13 is unobstructed, the tendency for the fragile carbon black pellets to break up and go to loose black or dust by attrition or other mechanical contact is substantially minimized. The time required to effect complete drying of the wet pelleted carbon black in the tower 13 is relatively short, e.g., about 20 minutes, considerably less than that heretofore found necessary to effect complete drying in conventional rotary dryers, e.g., four hours.

A full understanding of this invention will be gained by reference to the following example. It should be understood, however, that the flow rates, amounts, temperature and other conditions set forth in this example are merely illustrative and do not unduly limit this invention.

*Example*

A heavy oil of aromatic type having an API gravity of 10° is axially charged to a carbon black furnace, such as that disclosed in U.S. Patents 2,375,795 or 2,564,700, at a rate of 115 gal./hr. Air at a rate of 52 M s.c.f.h. is tangentially introduced into the furnace. The furnace is operated at a pressure of about 0.30 p.s.i.g. The resulting hot gaseous furnace mixture, having a temperature of about 1800° F., is quenched by supplying water to the downstream end of the furnace at a rate of 250 gal./hr. The quenched furnace effluent, having a temperature of about 1200° F., and a moisture content of 50 volume percent, is introduced in the lower part of the quench-drying tower at a rate of 51 M s.c.f.h. Wet pelleted carbon black, having a moisture content of 50 weight percent and a temperature of 80° F. is introduced into the upper part of the quench-drying tower, at a locus remote from the locus of introducing of the effluent, at a rate of 37 lbs./sq. ft./hr. or 460 lbs./hr., wherein it is directly heat exchanged with the hot furnace effluent having a velocity of 2.3 ft./sec. The residence time for the carbon black in the quench-drying tower is about 20 minutes and the pressure drop therein is about 0.17 p.s.i. Dry pelleted carbon black, having a moisture content of about 1 weight percent and a temperature of about 300° F., is withdrawn from quench-drying tower at the lower end thereof, and the cooled or quenched furnace effluent is withdrawn from the upper end of the quench-drying tower, this cooled effluent having a moisture content of 52 volume percent and a temperature of 925° F. The ultimate yield of the carbon black is 4.0 lbs./gal. of oil charged to the furnace. The subsequent collection of the flocculent carbon black and its pelleting in the wet pelleting mill is conventional and need not be detailed.

Various modifications and alterations of this invention become apparent to those skilled in the art from the foregoing discussion and accompanying drawing without departing from the scope and spirit of this invention, and it is to be understood that the above discussion and examples merely set forth preferred and illustrative embodiments of this invention and do not unduly limit the same.

I claim:

In a process for drying wet pelleted carbon black, wherein a stream of hot gaseous effluent from a carbon black furnace is quenched with water in a secondary quench zone, the resulting quenched effluent is passed to a gas-solids separation zone, and the resulting separated finely divided carbon black is wet pelleted, the improvement comprising introducing the resulting wet pelleted carbon black having a moisture content in the range of 40 to 55 percent into the upper portion of a vertical quench-drying zone, introducing said stream of gaseous effluent from said furnace directly into the lower portion of said quench-drying zone at a temperature in the range of 1000 to 2500° F. and at a velocity sufficient to impede the settling of said carbon black in said latter zone, tending to suspend the same, and sufficient to insure substantially complete drying of said pelleted carbon black, countercurrently contacting in the latter zone a downwardly descending stream of said wet pelleted carbon black with said gaseous effluent so as to effect substantially complete drying of said wet pelleted carbon black to a moisture content of about 1 percent or lower and substantial quenching and cooling of said gaseous effluent, the only moisture entering said quench-drying zone being that found in said wet pelleted carbon black, withdrawing the resulting quenched and cooled effluent from the upper end of said quench-drying zone and passing said effluent to said secondary quench zone, and withdrawing dried carbon black pellets from the lower end of said quench-drying zone as the product of the process.

References Cited in the file of this patent

UNITED STATES PATENTS

| | | |
|---|---|---|
| 2,457,962 | Whaley | Jan. 4, 1949 |
| 2,695,837 | Benz | Nov. 30, 1954 |
| 2,843,942 | Whitsel | July 22, 1958 |
| 2,864,674 | King | Dec. 16, 1958 |
| 2,880,519 | Pollock | Apr. 7, 1959 |
| 2,952,921 | Wood et al. | Sept. 20, 1960 |
| 2,973,249 | Haas | Feb. 28, 1961 |